(12) United States Patent
Massari et al.

(10) Patent No.: US 9,714,337 B2
(45) Date of Patent: Jul. 25, 2017

(54) MINERAL FILLED POLYPROPYLENE COMPOSITION

(71) Applicant: BASELL POLIOLEFINE ITALIA S.R.L., Milan (IT)

(72) Inventors: Paola Massari, Ferrara (IT); Marco Ciarafoni, Ferrara (IT); Sander Willems, Parma (IT); Jurgen Rohrmann, Kelkheim (DE)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/105,492

(22) PCT Filed: Dec. 15, 2014

(86) PCT No.: PCT/EP2014/077790
§ 371 (c)(1),
(2) Date: Jun. 16, 2016

(87) PCT Pub. No.: WO2015/091372
PCT Pub. Date: Jun. 25, 2015

(65) Prior Publication Data
US 2016/0319118 A1 Nov. 3, 2016

(30) Foreign Application Priority Data

Dec. 16, 2013 (EP) .................... 13197434

(51) Int. Cl.
*C08L 23/12* (2006.01)
*B29C 45/00* (2006.01)

(52) U.S. Cl.
CPC .......... *C08L 23/12* (2013.01); *B29C 45/0001* (2013.01); *C08L 2205/025* (2013.01); *C08L 2207/02* (2013.01)

(58) Field of Classification Search
CPC ............... C08L 23/12; C08L 2205/025; C08L 2207/02; B29C 45/0001
See application file for complete search history.

(56) References Cited

FOREIGN PATENT DOCUMENTS

| EP | 2586823 A1 | 5/2013 |
| EP | 2669329 A1 | 12/2013 |
| JP | 2003105163 A | 4/2003 |
| WO | WO-9854258 A1 | 12/1998 |
| WO | WO-2004087805 A1 | 10/2004 |

OTHER PUBLICATIONS

PCT International Search Report and Written Opinion Mailed Apr. 10, 2015 (Oct. 4, 2015) Corresponding PCT/EP2014/077790.

*Primary Examiner* — Robert Jones, Jr.

(57) ABSTRACT

The present disclosure relates to a polypropylene composition for the production of molded articles, such as finished parts for the automotive industry, has melt flow rate (230° C., 2.16 kg) of at least 25 g/10 min and comprising:
(A) 50-95% of a composition having an intrinsic viscosity of the fraction soluble in xylene at 25° C. of 3.0-5.0 dl/g; and
  (A1) 70-95% of a propylene homopolymer having a polydispersity index (PI) of 4.3-10, a fraction insoluble in xylene at 25° C. higher than 90% and an MFR (230° C., 2.16 kg) of 100-250 g/10 min;
  (A2) 5-30% of a copolymer of propylene with 36-44% of ethylene-derived units;
(B) optionally up to 45% of a heterophasic propylene polymer, having an MFR (230° C., 2.16 kg) of 10-25 g/10 min, a flexural modulus higher than 1400 MPa, comprising 5-20% of a copolymer rubber component and 80-95% of a matrix propylene polymer component;
(C) 2-10% of an ethylene based elastoplastic copolymer; and
(D) optionally up to 20% of talc.

10 Claims, No Drawings

MINERAL FILLED POLYPROPYLENE COMPOSITION

This application is the U.S. National Phase of PCT International Application PCT/EP2014/077790, filed Dec. 15, 2014, claiming benefit of priority to European Patent Application No. 13197434.7, filed Dec. 16, 2013, the contents of which are incorporated herein by reference in their entirety.

The present disclosure relates to thermoplastic polypropylene compositions and filled compositions thereof, comprising talc as a mineral filler, for use in the production of molded articles for interior trims and exterior parts having, good processability and improved surface properties.

BACKGROUND OF THE INVENTION

Articles having smooth, mold-imprinted surfaces are often used in trim components for interior designs, e.g. in cars or airplanes, and external parts. The automotive industry imposes stringent requirements for finished parts. Low total carbon emission, low fogging and low odor with good scratch resistance are common requirements for interior trim components such as instrument panels, door panels and quarter panel trims that are produced via injection molding.

The exterior parts, including bumper assemblies and structural modules such as front end module carriers, may require high performance filled compounds. Exterior trims like side protection trims, cowl grills, wheel arch liners and covering parts like rocker panels, body side moldings or fender liners often require specific properties in combination with good surface appearance.

U.S. Pat. No. 6,441,094 discloses impact resistant polyolefin compositions comprising two polymer fractions with different melt flow rate (MFR) values (bimodal matrix) and a rubbery phase formed by an elastomeric copolymer of ethylene. The polyolefin composition in U.S. Pat. No. 6,441,094 is described as comprising processability, mechanical and optical properties suitable for injection molded parts.

The materials used for exterior and interior trims need to deliver flexibility related properties like narrow gap tolerances, superior scratch resistance, good paint adhesion and processability.

Due to their free-flowing characteristics, different blends filled with fillers such as talcum have been used in such applications. However, the potential of talcum-reinforced blends is limited for molding of rigid finished articles, such as car dashboards, due to their inherent low flexural stiffness. Recently, low density materials capable of high mechanical performance are desired to match increasing demand for lightweight car-parts to increase fuel efficiency without compromising safety and performance.

The need exists for composite materials for molded articles with improved free-flowing properties that retain the advantages of shrinkage and impact/stiffness balance with improved surface quality.

SUMMARY OF THE INVENTION

The present disclosure relates to conventional molds with beneficial "gap tolerance" and "tool shrinkage" properties. The composition described herein is a valuable solution for the automotive field for using existing molds with both the economic advantage and security of supply.

DETAILED DESCRIPTION OF THE INVENTION

Accordingly, an object of the present disclosure is a composition having melt flow rate (MFR), measured according to ISO 1133 (230° C., 2.16 kg), of equal to or higher than 10 g/10 min, such as higher than 25 g/10 min and from 30 to 50 g/10 min, comprising:

(A) from 50 to 95%, including from 55 to 90% and from 70 to 85% by weight, of a propylene composition comprising (percent by weight):
 (A1) 70-95%, such as 75-90% and 80-88% by weight, of a propylene homopolymer having a polydispersity index (PI) value of from 4.3 to 10, including from 4.6 to 10 and from 5.1 to 8; a fraction insoluble in xylene at 25° C. of higher than 90%, such as higher than 95% and higher than 97%; and MFR (ISO 1133—230° C., 2.16 Kg) of from 100 to 250 g/10 min, including from 120 to 220 g/10 min and from 150 to 200 g/10 min;
 (A2) 5-30%, including 10-25% and 12-19% by weight, of a copolymer of propylene with 36 to 44%, such as 39 to 43% and 39 to 41%, of ethylene-derived units; wherein the composition (A) having an intrinsic viscosity of the fraction soluble in xylene at 25° C. (XSIV) comprised between 3.0 and 5.0 dl/g, including between 3.5 and 5.0 dl/g and between 3.8 and 4.5 dl/g;
(B) from 0 to 45%, such as from 5 to 35% and from 20 to 33% by weight, of a heterophasic propylene polymer, having MFR (ISO 1133, 230° C., 2.16 kg) of from 10 to 25 g/10 min; a flexural modulus higher than 1400, such as from 1500 to 1800 MPa measured according to ISO 178, and having from 5 to 20% of a copolymer rubber component and from 80 to 95% of a propylene polymer matrix component;
(C) from 2 to 10%, including from 3 to 6% by weight, of an ethylene based elastoplastic copolymer (plastomer), typically an impact modifier such as copolymers of ethylene with C4-C12 alpha-olefins; and
(D) from 0 to 20%, such as from 1 to 15% and from 5 to 10% by weight, of talc.

The composition optionally comprises other conventional additives and pigments in premix. For instance, in some embodiments 1 to 10%, including from 3 to 8% by weight, of the composition of the present disclosure is a conventional premix (E) made of a standard polymer carrier, pigments and other additives. The sum of the percentage amounts of the individual components of the composition equal 100% by weight of the composition, including conventional additives and pigments.

The first propylene-based component (A) may be endowed with one or more of the following features:
 an MFR L (Melt Flow Rate according to ISO 1133, condition L, i.e. 230° C. and 2.16 kg load) from 30 to 90 g/10 min, including from 40 to 80 g/10 min and from 50 to 70 g/10 min;
 a Flexural Modulus (ISO 178) before nucleation of from 1250 MPa to 2000 MPa, such as from 1300 to 1800 MPa and from 1350 to 1450 MPa; and
 a Flexural Modulus (ISO 178) after nucleation of from 1580 MPa to 2000 MPa, including from 1600 to 1800 MPa and from 1620 to 1750 MPa.

As defined herein, the term "copolymer" includes polymers containing only two kinds of monomers.

The component (A) can be obtained according to the process and in presence of a Ziegler-Natta catalyst as described in WIPO Pat. App. Pub. No. WO2011/036016.

In certain embodiments, component (B) comprises:
(B1) from 80 to 95% by weight of a polypropylene matrix, a solubility in xylene at room temperature lower than 5% wt, such as lower than 2% wt of the component (B1), and a melt flow rate higher than 20 g/10 min, such as from 25 to 35 g/10 min;

(B2) from 5 to 20% by weight, of a copolymer of ethylene with an alpha-olefin, such as propylene, as a comonomer, with the copolymer rubber containing from 40 to 60% by weight, including from 40 to 55% by weight of ethylene, and in certain embodiments having a solubility in xylene at room temperature (about 25° C.) higher than 80% by weight of component (B2).

The component (B) can be prepared by melt blending the component in an extruder or by a sequential polymerization process, comprising at least two sequential steps, wherein matrix (B1) and rubber (B2) are components prepared in separate subsequent steps, operating in each step in the presence of the polymer formed and the catalyst used in the preceding step. In some embodiments, component (B) is a heterophasic copolymer comprising a propylene polymer matrix and an ethylene/alpha-olefin copolymer rubber, such as an ethylene-propylene copolymer rubber component (EPR).

Polymer compositions suitable for use as component (B) can be prepared with catalyst components such as the one disclosed in WIPO Pat. App. Pub. No. WO 2004/087807 by changing residence time, ethylene feeding and hydrogen feeding to produce the desired matrix/rubber split and content of comonomers in the components.

According to the present disclosure, it is neither necessary nor desired to crosslink the components (A) and (B) by vulcanization.

In some embodiments, the ethylene-based plastomer (C) suitable for use in the compositions of the present disclosure is a copolymer of ethylene with octane-1 containing at least 20 wt %, including from 20 to 50 wt % and from 20 to 45% by weight, of units derived from octane-1 as a comonomer ($^{13}$C-NMR analysis).

Ethylene-based plastomers (C) for use in the present disclosure include ethylene/octene-1 copolymers having a hardness (Shore A, ASTM D-2240) value equal to or lower than 90 points, including equal to or lower than 85 points and equal to or lower than 80 points. In some embodiments, the ethylene-based plastomer (C) has density lower than 0.89 g/cm$^3$, such as lower than 0.87 g/cm$^3$ (measured according to ASTM D-792). For example, suitable plastomers for use as component (C) are Engage 8100, 8150, and 8200, which are commercially available from DuPont Dow Elastomers. For instance, in the Examples section of the present application Engage 8150 was used (metallocene ethylene-octene-1 copolymer with 25 wt % octene-1, MFR 1.4 g/10 min at 230/2.16 ISO1133, density 0.868 g/cm$^3$).

In certain embodiments, the talc for use in the compositions of the present disclosure as component (D) is a commercial talc in particle form having an average particle size (Sedigraph ISO 13317-3) ranging from (D50) 0.1 to 20 micrometers (μm). In further embodiments, the talc is a high aspect ratio talc having a lamellarity index equal to or higher than 2.8. The lamellarity index characterizes the shape and flatness of the particle (large dimension/thickness). The lamellarity index may be measured by the difference between the value of the mean dimension of the particles of the powder obtained by a particle size measurement by Malvern laser diffraction using a wet method (standard AFNOR NFX11-666) and the value of the mean diameter D50 obtained by a measurement by sedimentation using a "Sedigraph" (standard AFNOR X11-683), with this difference being related to the mean diameter D50. Reference is made to the article "G. Baudet and J. P. Rona, Ind. Min. Mines et Carr. Les Techn. June/July 1990, pp 55-61," which shows that this index is correlated to the mean ratio of the largest dimension of the particle to its smallest dimension.

"High lamellarity" is understood to mean a powder of which the lamellarity index is high, such as greater than 2.8, including equal to or higher than 4.

In certain embodiments, additional conventional additives may further be included without departing from the scope of the present disclosure, in amounts up to 10% by weight of the composition. For instance, in applications where scratch resistance may be improved, the incorporation of minor amounts of an anti-scratch additive into the composition may be performed. Anti-scratch additives that can be used in the compositions of the disclosure are all those known in the art as having, e.g. a lubricating effect that leads to less scratch visibility. Examples of such compounds are erucamide, oleamide and polydimethylsiloxane.

In additional embodiments, the scratch resistance can also be improved by the incorporation of higher amounts of pigments. In further embodiments, the incorporation of high density polyethylene (HDPE) may improve the scratch resistance of the composition.

The compositions of the present disclosure, in some embodiments, have a density (ISO 1183) of lower than 0.99 g/cm$^3$. The compositions of the present disclosure can be prepared by melt mixing the polymeric components and filler and additives, typically in an extruder.

The compositions of the present disclosure, in certain embodiments, may be characterized by a flexural modulus (ISO178) higher than 1000 MPa, such as higher than 1200 MPa, higher than 1400 MPa and from 1900 to 2000 MPa.

Advantageously, the compositions of the present disclosure demonstrate improvements in standard "odor testing" with respect to other compositions in the state of the art. In some embodiments, the compositions are characterized by high flowability of the polymeric components obtained ex-reactor as opposed to peroxide visbreaking.

The compositions of the present disclosure, due to their beneficial properties related to high stiffness, high flowability and good impact behavior, provide improved surface properties (such as low gloss and improved scratch resistance). The compositions of the present disclosure are suitable for molded articles such as finished parts for the automotive industry.

Accordingly, another object of the present disclosure is a molded article prepared from a composition according to the disclosure. In some embodiments, the molded articles can be finished parts for the automotive industry, such as dashboards, instrument panels or other interior or exterior trim components for a car.

According to a further object, the present disclosure provides a vehicle, such as a car or a truck, comprising a molded article according to the disclosure.

EXAMPLES

The following examples are given for illustrating but not limiting purposes.

The following analytical methods are used to determine the properties reported in the description and in the examples.

Density:
Determined according to ISO 1183, unless specified otherwise.

Melt flow rate: Melt Mass-Flow (MFR) and Melt Volume-Flow (MVR)
Determined according to ISO 1133 (230° C., 2.16 Kg), unless specified otherwise.

Polydispersity Index (PI):
This property relates to the molecular weight distribution of the polymer. To determine the PI value, the modulus separation at a low modulus value, e.g. 500 Pa, is determined at a temperature of 200° C. by an RMS-800 parallel plates rheometer marketed by Rheometrics (USA), operating at an oscillation frequency which increases from 0.01 rad/second to 100 rad/second. From the modulus separation value, the PI can be derived using the following equation:

PI=54.6×(modulus separation)−1.76 wherein the modulus separation (MS) is defined as:

MS=(frequency at G'=500 Pa)/(frequency at G"=500 Pa)

wherein G' is the storage modulus and G" is the low modulus.

Flexural modulus and flexural strain and strength:
Determined according to ISO method 178. Specimens for flexural test were prepared by injection moulding. Specimen (thickness 4 mm) were prepared according to ISO 294-1.

Izod Notched Impact Strength:
Determined according to ISO 180/1A

Scratch Resistance
The scratch resistance was measured according to the standard scratch method of General Motors GME 60280 on an Erichsen grid scratch apparatus; where the Erichsen ball tip has the following properties: d=1 mm, with a load of 10 N; and a speed 1000 mm/min. The difference of brightness (dL) is measured 7 days after molding with a colorimeter, before scratching and 48 hours after scratching. Smaller differences in brightness (dL) values indicate better scratch behavior, i.e. resistance (according to N111/N127, fine/coarse).

Gloss was measured according to the General Motor GME 60413 standard.

Xylene Solubles (XS)
Determined as follows: 2.5 g of polymer and 250 ml of xylene are introduced in a glass flask equipped with a refrigerator and a magnetic stirrer. The temperature is raised in 30 minutes up to the boiling point of the solvent. The resulting clear solution is then kept under reflux and stirred for 30 minutes. The closed flask is then kept in a thermostatic water bath at 25° C. for 30 minutes. The resulting solid is filtered on quick filtering paper. 100 ml of the filtered liquid is poured into a previously weighed aluminum container, which is heated on a heating plate under nitrogen flow to remove the solvent by evaporation. The container is then kept on an oven at 80° C. under vacuum until a constant weight is obtained. The weight percentage of polymer soluble in xylene at room temperature is then calculated.

Intrinsic Viscosity of the soluble fraction (XSIV) was determined in tetrahydronaphthalene at 135° C.

Longitudinal (MD) and transversal (TD) mold shrinkage according to the following test method:
Shrinkage was measured after 24 hours on plaques of 195×100×2.5 mm molded in an injection molding machine known as "Demag 160" (where 160 stands for 160 tons of clamping force).

The injection conditions are:
melt temperature=210° C.;
injection moulding pressure=80 bar;
mold temperature=30° C.;
injection time=11 seconds;
holding pressure=50 bar;
holding time=30 seconds;
cooling time=20 sec;
cycle time=76 sec;
screw speed=80 rpm (1/min).

The plaque is measured 24 hours after molding (via determination of mold shrinkage) and after annealing for 48 hours at 80° C. (via determination of total shrinkage after bake), through calipers, and the shrinkage is given by:

$$\text{Longitudinal shrinkage } (MD) = \frac{195 - \text{read\_value}}{195} \times 100$$

$$\text{Transversal shrinkage } (TD) = \frac{100 - \text{read\_value}}{100} \times 100$$

where 195 is the length (in mm) of the plaque along the flow direction (MD), measured immediately after molding; 100 is the length (in mm) of the plaque crosswise the flow direction (TD), measured immediately after molding; and the read_value is the plaque length in the relevant direction.

Biaxial Impact Measure According to Method ISO6603/2:

All the compositions described in the examples were produced with a twin-screw extruder marketed as Krupp Werner & Pfleiderer/1973, ZSK 53; screw diameter: 2×53, 36D with a screw rotation speed of 150 rpm and a melt temperature of 230° C.

All compounds obtained were injection molded according to DIN EN ISO 1873-2 (2006-08).

Comparative Examples 1-2 and Examples 3-4

HECO 1 is a heterophasic copolymer prepared according to Example 1 of WIPO Pat. App. Pub. No. WO2011/036016, with the differences reported in Table 1.

HECO 2 is a heterophasic copolymer prepared according to the Comparative Examples of WIPO Pat. App. Pub. No. WO2004/087807, with the differences reported in Table 1.

HECO 3 is a heterophasic copolymer prepared according to Example 1 of WIPO Pat. App. Pub. No. WO2004/087807, with the differences reported in Table 1.

HECO 4 is a heterophasic copolymer prepared according to Example 1 of WO01/92406, except that no ethylene was fed in the first reactor to produce a homopolymer and with the other differences reported in Table 1.

The main properties of the propylene polymeric components are reported in Table 1.

TABLE 1

Properties of the propylene polymeric components

| | Matrix propylene homopolymer | | | Copolymer rubber | | | Final | | | |
|---|---|---|---|---|---|---|---|---|---|---|
| | MFR g/10' | XS % | PI | amount % wt | C2 % wt | XS % | XSIV dl/g | MFR g/10' | Flex. Mod. MPa | Nucleating Agent % |
| HECO1 (A) | 188 | 2.5 | 6.7 | 14 | 40 | 14.7 | 4.10 | 71 | 1380 | None |
| HECO2 | 80 | 2.3 | 4.2 | 18 | 46 | 17.0 | 2.30 | 44 | 1397 | Sodium |

TABLE 1-continued

Properties of the propylene polymeric components

| | Matrix propylene homopolymer | | | Copolymer rubber | | | | Final | | Flex. Mod. MPa | Nucleating Agent % |
|---|---|---|---|---|---|---|---|---|---|---|---|
| | MFR g/10' | XS % | PI | amount % wt | C2 % wt | XS % | XSIV dl/g | MFR g/10' | | | |
| (comparative) | | | | | | | | | | | Stearate |
| HECO3 (B) | 30 | 1.8 | 6.0 | 12 | 45 | 11.0 | 2.70 | 18 | | 1650 | Talc HM05 |
| HECO4 (comparative) | 170 | 2.5 | 3.3 | 15 | 49 | 14.0 | 2.35 | 100 | | 1180 | None |

The compositions of each example comprise the polymeric components of Table 1 and other components in amounts as indicated in Table 2.

TABLE 2

Compositions

| | | Example 1 (comparative) | Example 2 (comparative) | Example 3 | Example 4 |
|---|---|---|---|---|---|
| HECO1 (A) | % w | 0 | 0 | 53.50 | 84.50 |
| HECO2 (comparative) | % w | 55.50 | 0 | 0 | 0 |
| HECO3 (B) | % w | 30.50 | 30.50 | 30.50 | 0 |
| HECO4 (comparative) | % w | 0 | 54.00 | 0 | 0 |
| Engage 8150 (C) | % w | 3.00 | 4.50 | 5.00 | 4.50 |
| Talc Luzenac Steamic T1 from Imerys, 8μ (D) | % w | 6.00 | 6.00 | 6.00 | 6.00 |
| Premix (E) | % w | 5.00 | 5.00 | 5.00 | 5.00 |
| Total Rubber content - Calculated | % w | 16.65 | 16.26 | 16.15 | 16.33 |
| Total MFR - Estimated (2.16 g/230° C.) | (g/10') | 26.10 | 39.90 | 32.30 | 50.90 |

The Premix (additives+black pigment MB) comprises the constituents reported below (weight percentage with respect to the overall composition):

| Premix component | Wt % |
|---|---|
| Homopolymer flakes* | 1.50 |
| Irganox 1010 | 0.10 |
| Irgafos 168 | 0.10 |
| Tinuvin 770 DF | 0.20 |
| Chimassorb 944 LD | 0.10 |
| Silicone MB 50-001 MP (Multibase) (UHMW Silicone gum 50% MB in PP) | 1.00 |
| BK MB - LD32232 (Ferro) (Carbon black, 40% in LD-PE) | 2.00 |

*MP HF501N (flakes) homopolymer available from LyondellBasell having a density of 0.9 g/cm$^3$, a melt flow rate (MFR) of 10 g/10 min (230° C./2.16 kg), and a tensile modulus of 1550 MPa.

The main properties of the obtained compositions are reported in Table 3.

TABLE 3

Properties of the compositions

| Properties | Norm | Unit | Example 1 (comparative) | Example 2 (comparative) | Example 3 | Example 4 |
|---|---|---|---|---|---|---|
| MFR 230/2.16 | ISO 1133 | g/10' | 27.8 | 38.1 | 31.8 | 46.5 |
| MVR 230/2.16 | ISO 1133 | cm$^3$/10 | 36.2 | 49.6 | 41.4 | 60.6 |
| Ash content 1 h, 625° C. | ISO 3451/1 | % | 5.86 | 5.70 | 5.68 | 5.47 |
| Flexural Modulus (E-Modul) | ISO 178 | N/mm$^2$ | 1939 | 1897 | 1987 | 1921 |
| Flex strength at 3.5% strain (Sb3.5) | ISO 178 | N/mm$^2$ | 39.1 | 38.7 | 39.9 | 38.8 |
| Elongation at Flex Strength (DbB) | ISO 178 | % | 5.1 | 5.0 | 5.0 | 4.9 |
| Flexural strength (at yield) (SbB) | ISO 178 | N/mm$^2$ | 41.4 | 40.8 | 42.0 | 40.5 |
| Izod Notched Impact Strength 23° C. | ISO 180 A | kJ/m$^2$ | 5.7 | 5.9 | 5.8 | 5.2 |
| Izod Notched Impact Strength 0° C. | ISO 180 A | kJ/m$^2$ | 4.3 | 4.3 | 4.4 | 4.0 |

TABLE 3-continued

Properties of the compositions

| Properties | Norm | Unit | Example 1 (comparative) | Example 2 (comparative) | Example 3 | Example 4 |
|---|---|---|---|---|---|---|
| HDT B (0.45 MPa) | ISO 75/1 + 2 | °C. | 101.7 | 96.2 | 95.9 | 104.5 |
| Odor (VW) | VDA 270 | Note 1-6 | 2.5 | 2.7 | 2.5 | 3.2 |
| Gloss 60°, N111 after 7 days | GME 60413 | G | 3.0 | 3.0 | 2.9 | 2.9 |
| Gloss 60°, N127 after 7 days | GME 60413 | G | 2.9 | 2.9 | 2.9 | 3 |
| Scratch resistance (10 N), N111 after 7 days | GME 60280 | dL* | 0.6 | 0.4 | 0.5 | 0.1 |
| Scratch resistance (10 N), N127 after 7 days | GME 60280 | dL* | 0.6 | 0.3 | 0.4 | 0.0 |
| Mold shrinkage (tool shrinkage) parallel | | % | 1.06 | 1.08 | 1.13 | 1.06 |
| Mold shrinkage (tool shrinkage) transversal | | % | 1.19 | 1.17 | 1.22 | 1.16 |
| Total shrinkage (after bake shrinkage) parallel | | % | 1.32 | 1.40 | 1.44 | 1.35 |
| Total shrinkage (after bake shrinkage) transversal | | % | 1.46 | 1.47 | 1.52 | 1.45 |
| Biaxial Impact strength at 0° C. | | | | | | |
| Peak Force Fm | ISO 6603/2 | N | 3500.6 | 3286.0 | 3656.4 | 3010.5 |
| Peak Deflection Sm | ISO 6603/2 | mm | 11.3 | 10.3 | 12.0 | 9.2 |
| Peak Energy Wm | ISO 6603/2 | J | 21.60 | 18.50 | 23.80 | 14.70 |
| Total Energy Wp | ISO 6603/2 | J | 25.70 | 21.30 | 26.80 | 17.60 |
| Total Deflection Sp | ISO 6603/2 | mm | 12.60 | 11.50 | 12.90 | 10.70 |
| Break Type | ISO 6603/2 | Visual | 10 C. | 10 C. | 10 C. | 10 C. |

What is claimed is:

1. A composition having a melt flow rate (MFR), measured according to ISO 1133-230° C., 2.16 kg, of equal to or higher than 25 g /10 min, comprising:
   (A) from 50 to 95% by weight of a propylene composition comprising (percent by weight):
      (A1) 70-95% by weight of a propylene homopolymer having a polydispersity index (PI) of 4.3 to 10, a fraction insoluble in xylene at 25° C. higher than 90% and a MFR (ISO 1133-230° C., 2.16 kg) of 100 to 250 g/10 min;
      (A2) 5-30% by weight of a copolymer of propylene with 36 to 44% of ethylene-derived units;
   wherein the composition (A) comprises an intrinsic viscosity of the fraction soluble in xylene at 25° C. (XSIV) between 3.0 and 5.0 dl/g;
   (B) from 0 to 45% by weight of a heterophasic propylene polymer, having an MFR (ISO 1133-230° C., 2.16 kg) of from 10 to 25 g/10 min; a flexural modulus higher than 1400 MPa measured according to ISO 178, from 5 to 20% of a copolymer rubber component and from 80 to 95% of a matrix propylene polymer component;
   (C) from 2 to 10% by weight of an ethylene based elastoplastic copolymer; and
   (D) from 0 to 20% of talc;
   the sum of the percentage amounts of the individual components of the composition being equal to 100%, including conventional additives and pigments.

2. The composition of claim 1, wherein the component (A) has an MFR L (melt flow rate according to ISO 1133, 230° C. and 2.16 kg load) of from 30 to 90 g/10 min.

3. The composition of claim 1, wherein the component (C) is an ethylene/octene-1 copolymer, having a hardness (Shore A, ASTM D-2240) value equal to or lower than 90 points and a density lower than 0.890 g/cm³.

4. The composition of claim 1, wherein the component (D) is a high aspect ratio talc with a lamellarity index equal to or higher than 2.8.

5. A molded article prepared from the composition of claim 1.

6. The molded article of claim 5, comprising a finished part for use in the automotive industry.

7. A vehicle comprising the molded article of claim 6.

8. The composition of claim 1, wherein component (A) comprises a flexural modulus (ISO 178) before nucleationj of 1250-2000 MPa.

9. The composition of claim 1, wherein component (A) comprises a flexural modulus (ISO 178) before nucleationj of 1580-2000 MPa.

10. The composition of claim 6, wherein component (D) is a high aspect ratio talc comprising a lamellarity index equal to or greater than 4.

* * * * *